000# United States Patent Office 2,995,448
Patented Aug. 8, 1961

2,995,448
CLOUD STABILIZATION IN CITRUS JUICE
Theodore J. Kew, Winter Park, and Matthew K. Veldhuis, Winter Haven, Fla., assignors to the United States of America as represented by the Secretary of Agriculture
No Drawing. Filed Feb. 15, 1961, Ser. No. 89,587
2 Claims. (Cl. 99—105)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a method for increasing the stability of the suspension of fine insoluble solids or "cloud" in citrus juices such as orange, grapefruit, and tangerine.

It is well known in the art that freshly prepared citrus juices are not clear but contain a cloud of pulp and colloidal material suspended in the juice serum. It is generally recognized that much of the flavor is associated with the cloud material rather than with the clear serum. It is obvious that to receive consumer acceptance, a concentrated citrus juice product must form a reconstituted juice having the characteristic cloud of the freshly prepared juice.

At the present time, citrus juices are preserved on a large scale in the form of 4-fold (42° Brix) frozen concentrates. Although these products have received wide acceptance, there is one problem that has always beset the industry. This problem concerns the fact that on storage the concentrates tend to lose their cloud (the suspended pulp tends to clot and settle out). This detrimental effect is accelerated by increased storage temperature. Lack of cloud stability on storage is deleterious because the stored concentrate will no longer produce a reconstituted juice with characteristic cloud. Thus, the reconstituted juice will have a curdy appearance and pulp will settle out rapidly leaving a relatively clear supernatant liquid, if the reconstituted juice is not kept agitated.

Cloud loss is believed to be the result of pectic enzyme activity on the natural pectin in the juice and it has long been the practice to heat citrus juices to temperatures above that necessary to retard microbial growth in order to inactivate pectinesterase. Pectinesterase facilitates removal of methoxyl from pectin which latter substance stabilizes the desirable suspension of fine insoluble solids or cloud in citrus juices such as orange, grapefruit, and tangerine. Conventional commercial techniques that employ heat to inactivate or partially inactivate pectinesterase give rise to "cooked" or off-flavored products and heat treating does not always prevent cloud loss.

It is the object of this invention to reduce pectinesterase activity in pulpy juices such as orange juice and other citrus juices and to stabilize the suspension of cloud material in the juice by the use of a water extract from grape leaves.

In general, the process of this invention involves the addition of about one part by volume of a water extract of grape leaves to one part by volume of citrus juice concentrate, the water extract of grape leaves comprising a portion of the water of reconstitution customarily added to citrus juice concentrates prior to consumption. A typical citrus juice reconstitution involves about three parts by volume of water to one part by volume of 42° Brix juice concentrate.

Alternatively, it is possible to incorporate the water extract of grape leaves into the juice concentrate prior to freezing and storage. If this particular embodiment is used, a more concentrated citrus juice (approximately 60° Brix, for example) is prepared and then cut back to about 40° Brix concentrate with a water extract of grape leaves (i.e., approximately two parts by volume of 60° Brix juice diluted with one part by volume of grape leaf water extract). Juice concentrate frozen and stored with grape leaf water extract added can be reconstituted before being consumed in the usual manner by dilution with water (i.e., one part by volume of juice concentrate plus three parts by volume of water).

The following examples illustrate the invention in more detail:

EXAMPLE 1

A water extract of grape leaves was prepared in the following manner: fresh grape leaves were rinsed in tap water to remove dust and any water soluble residue. The rinsed leaves were dipped in dilute hydrochloric acid and again rinsed in tap water to remove possible spray residue. The tap water was removed by a rinse in distilled water and the leaves were then air dried. Forty grams of leaves with stems removed and 400 grams of distilled water were comminuted for three minutes in a high speed blending apparatus. The water-grape leaf slurry was then strained through four layers of cheese cloth. The extract after being strained was centrifuged at 1400 r.p.m. for 10 minutes in the International Type SB, Size 1, centrifuge using 50 ml. tubes and the supernatant liquid was carefully decanted from the insoluble residue. The supernatant liquid which functions to inhibit pectin esterase activity was used without further treatment for cloud stabilizing purposes.

The grape-leaf extract may be prepared simply by macerating the leaves in water and removing the insoluble residue. The active material may be removed from the water solution by extraction with ethyl ether which separates the extraneous materials soluble in water but not in ether. The active material may be returned to water solution by evaporation of the ether in the presence of water. A purified or a crude material may be used to control pectinesterase activity.

A portion of the water extract of grape leaves prepared according to the initial method described in this example was added to orange juice and the pectinesterase activity determined. The same orange juice was then assayed without the added grape-leaf water extract but with sufficient distilled water added to effect an equivalent dilution. The pectinesterase activity in the water diluted juice was much greater as is shown in the following table:

Table I
PECTINESTERASE ACTIVITY OF A RECONSTITUTED ORANGE CONCENTRATE

| 1 part 42° Brix concentrate<br>1 part grape-leaf extract<br>2 parts water | 1 part 42° Brix concentrate<br>3 parts water |
|---|---|
| (PEu) ml.×10$^4$<br>7.7 | (PEu) ml.×10$^4$<br>15.7 |

EXAMPLE 2

The following example demonstrates the stabilizing effect of grape leaf water extract used as a portion of the water of reconstitution for frozen citrus juice concentrate.

A can of frozen 42° Brix concentrated orange juice was thawed, divided, and one portion reconstituted by diluting 1 volume of concentrate with three volumes of distilled water. The other portion was reconstituted by adding to one volume of the concentrate two volumes of distilled water and one volume of the water extract of grape leaves. Portions of each reconstituted sample were placed in test tubes. Sodium benzoate and toluene were added as preservatives. The concentration of sodium benzoate was 1.2%, and 2 drops of toluene were added to each tube. The test tubes were closed with screw caps, stored at 40° F., and observed periodically for stability of the suspended insoluble solids or "cloud." All tubes without the grape-leaf extract clarified within one month. Tubes that contained the grape-leaf extract showed no clarification in a month and only half of them had clarified after a three month storage period.

EXAMPLE 3

This example demonstrates the incorporation of grape-leaf water extract into 42° Brix orange concentrate prior to storage. Orange juice was concentrated to 60° Brix and grape-leaf water extract prepared as in Example 1 was used to dilute a portion of the 60° Brix concentrate down to 42° Brix. This dilution involves approximately 2 parts by volume of 60° Brix juice and one part by volume of grape-leaf water extract. Another portion of the 60° Brix juice concentrate was similarly diluted to 42° Brix with distilled water. The two 42° Brix concentrates were canned and frozen. Cans of both concentrates were removed for observation of comparative cloud stability at two storage temperatures, room temperature, 77° F., and a temperature commonly found in a household refrigerator, 40° F. After varying periods of storage, the samples of concentrate were removed from storage, reconstituted juices prepared therefrom and the density of the cloud in the reconstituted juices measured.

The cloud density of grape leaf extract treated juices was measured by centrifuging 50 ml. portions of the reconstituted juice for ten minutes at 1400 r.p.m. in an International Type SB, No. 1 centrifuge. The supernatant was strained through a 100 mesh stainless steel screen to remove floating juice cells. Transmittance was measured with an Evelyn colorimeter using a No. 720 filter. Cloud density values (2-log of percentage light transmission) were recorded. Such measurements made before and after storage were used to calculate the percentage of cloud density retained by each sample. For instance, if the cloud density values on the unstored and stored products were .838 and .796, respectively, then percentage of cloud retained in the stored product was 95%.

Table II
INHIBITION OF CLOUD LOSS BY ADDING GRAPE-LEAF EXTRACT TO ORANGE CONCENTRATE HELD AT 77° F.

| 42° Brix orange concentrate stored at 77° F. | Percentage of cloud retained after storage for— | | |
|---|---|---|---|
| | 3 hours, percent | 5 hours, percent | 7 hours, percent |
| With no inhibitor (check) | 95.0 | 83.4 | 35.9 |
| With grape-leaf extract added | 92.6 | 83.3 | 64.1 |

EXAMPLE 4

The experiment above was repeated except that the concentrates were stored at 40° F. The results obtained are tabulated below:

Table III
INHIBITION OF CLOUD LOSS BY ADDING GRAPE-LEAF EXTRACT TO ORANGE CONCENTRATE HELD AT 40° F.

| 42° Brix orange concentrate stored at 40° F. | Percentage of cloud retained after storage for— | | | | |
|---|---|---|---|---|---|
| | 1 day, percent | 2 days, percent | 3 days, percent | 4 days, percent | 5 days, percent |
| With no inhibitor (check) | 73.0 | 26.5 | 12.9 | 8.1 | 7.2 |
| With grape-leaf extract added | 79.3 | 44.2 | 22.9 | 16.9 | 15.2 |

Experiments paralleling the experiments of the previous examples were carried out using grapefruit juice and tangerine juice. The effect of the water extract of grape leaves was the same in the case of these two juices as it was in the case of orange juice. The grape leaf water extract stabilized the cloud in both the juice concentrate and the reconstituted juice.

Cloud in juice concentrate or reconstituted juice is stabilized by incorporating grape-leaf water extract. The water extract of leaves of many varieties of muscadine grapes exhibits the property of inhibiting pectinesterase activity and stabilizing "cloud" in citrus juices. Water extracts of the following varieties were assayed and found to contain the enzyme inhibiting activity and cloud stabilizing property: Topsail, Stuckey, Tar Heel, Thomas, and Munsoniana as well as leaves from wild grapes, *Vitis munsoniana*.

We claim:

1. A method for reducing pectinesterase activity and stabilizing "cloud" in a reconstituted citrus juice which comprises incorporating, as a portion of the water of reconstitution, an amount at least equal by volume to the unreconstituted juice concentrate of a water extract of grape leaves, said water extract of grape leaves prepared by comminuting at room temperature a mixture of one part by weight of air-dried stem-free grape leaves and ten parts by weight of water and clarifying the comminuted grape leaf water mixture by mechanically removing the solids from the water extract.

2. A method for inhibiting pectinesterase activity and stabilizing the "cloud" in a citrus juice concentrate prior to the freezing and storing of the concentrate which comprises reducing an approximate six-fold concentrate to an approximate 4-fold concentrate by dilution with a water extract of grape leaves, said water extract of grape leaves prepared by comminuting at room temperature a mixture of one part by weight of air-dried stem-free grape leaves and ten parts by weight of water and clarifying the comminuted grape leaf water mixture by mechanically removing the solids from the water extract.

No references cited.